United States Patent [19]

Zeman

[11] 3,968,951

[45] July 13, 1976

[54] METHOD AND APPARATUS FOR MOLDING AN ELASTOMERIC FISHING LURE BODY

[76] Inventor: Jack R. Zeman, P.O. Box 10167, Fort Lauderdale, Fla. 33305

[22] Filed: Oct. 9, 1974

[21] Appl. No.: 513,480

[52] U.S. Cl. ............................... 249/55; 249/145; 425/249; 249/142
[51] Int. Cl.² ..................... B29F 1/10; B29F 1/022
[58] Field of Search ............ 249/55, 175, 142, 145; 425/249, DIG. 58, 450.1; 42/42.1, 42.53

[56] References Cited
UNITED STATES PATENTS

| | | | |
|---|---|---|---|
| 2,306,181 | 12/1942 | Neumann | 43/42.1 |
| 2,363,808 | 11/1944 | Sayre | 425/249 |
| 2,600,673 | 6/1952 | Murray | 43/42.1 |
| 3,193,890 | 7/1965 | Clary et al. | 249/145 |
| 3,433,292 | 3/1969 | McDonald | 425/249 X |
| 3,660,002 | 5/1972 | Morroni | 425/249 X |
| 3,748,774 | 7/1953 | Bryant | 43/42.1 |
| 3,861,075 | 1/1975 | Ingram | 43/42.53 X |

FOREIGN PATENTS OR APPLICATIONS 685,135   12/1952   United Kingdom ................ 43/42.53

Primary Examiner—Francis S. Husar
Assistant Examiner—David S. Safran
Attorney, Agent, or Firm—Oltman and Flynn

[57] ABSTRACT

Method and apparatus for injection molding an elstomeric fishing lure body for a weedless lure between cooperating dies which together define a mold cavity. One of the dies has a long, deep, narrow rib projecting into the mold cavity to form a complementary recess in the fishing lure body for concealing the hook end of a fishhook. A reciprocable plunger extends into the mold cavity at one end to form an anchoring recess for a metal or plastic head that is to be attached to this end of the elastomeric lure body and also to form a passageway leading to the bottom of the recess formed by the rib for receiving the shank of the fishhook.

1 Claim, 7 Drawing Figures

METHOD AND APPARATUS FOR MOLDING AN ELASTOMERIC FISHING LURE BODY

BACKGROUND AND SUMMARY OF THE INVENTION

My co-pending U.S. Pat. application, Ser. No. 512,098, filed Oct. 4, 1974, discloses and claims an artificial fishing lure having an elastomeric lure body. The present invention is directed to a method and an apparatus for molding such a lure body.

Various artificial fishing lures which incorporate a fishhook have been proposed heretofore. For example, my U.S. Pat. No. 3,646,699 discloses an artificial fishing lure which carries a semi-concealed fishhook that is pivotally mounted for movement from a retracted position to an extended, fish-impaling position when a fish strikes the lure.

The present invention is directed to a novel apparatus and method for molding the elastomeric body of an artificial weedless fishing lure, so as to provide a long, deep, narrow recess in the molded lure body for concealing the hook end of a fishhook and to provide for the attachment of a metal or plastic head on one end of the elastomeric lure body and for the anchoring of the shank of the fishhook. The present apparatus and method produces an elastomeric lure body that is readily flexible in the vicinity of the fishhook-concealing recess molded in it.

A principal object of this invention is to provide a novel and improved method of molding an elastomeric fishing lure body.

Another principal object of this invention is to provide a novel and improved apparatus for molding an elastomeric fishing lure body.

Further objects and advantages of this invention will be apparent from the following detailed description of a presently preferred embodiment shown in the accompanying drawings in which.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

Figure 1:
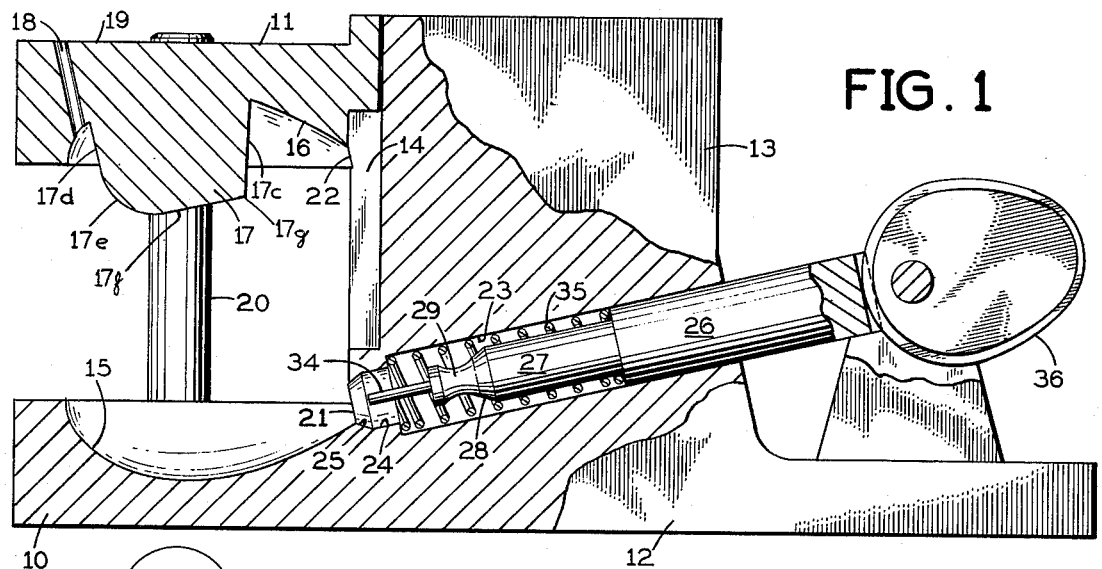
FIG. 1 is a view, partly in elevation and partly in longitudinal section, showing the present molding apparatus with its operating parts retracted.

Referring to FIG. 1, the apparatus of the present invention has a fixed lower die 10 and an upper die 11 that is reciprocable vertically toward and away from the lower die. The lower die 10 is integral with a base 12 having an upwardly extending standard 13 at one end of the lower die. This standard provides a vertical guideway 14 for the upper die 11. The lower die 10 presents an upwardly-facing concave recess 15 that is generally the shape of half an egg.

Figure 3:
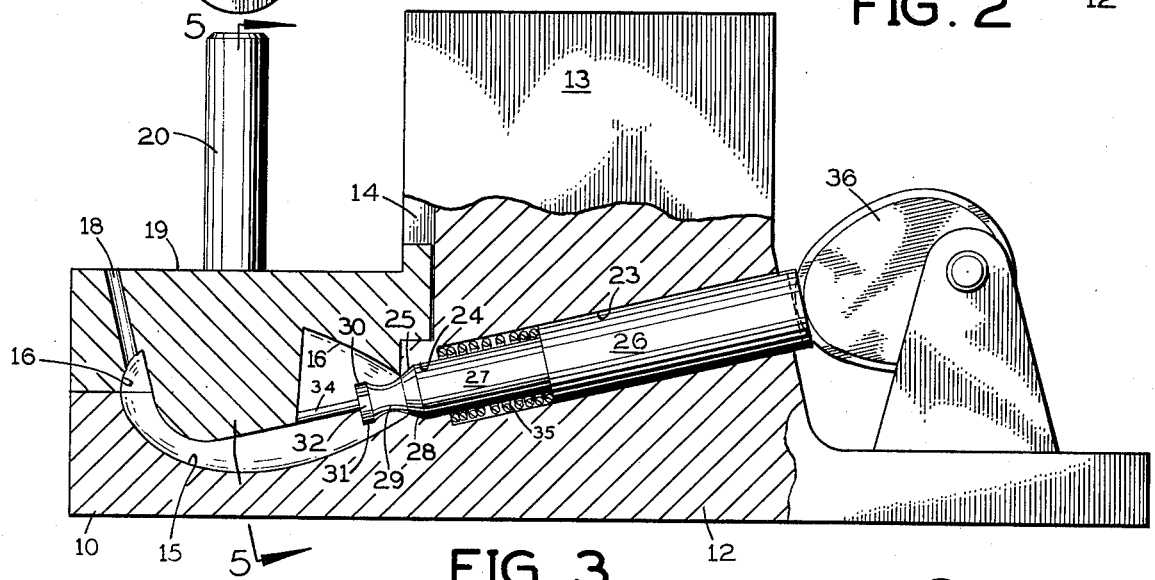
FIG. 3 is a view similar to FIG. 1, but showing the operating parts of the molding apparatus together for molding an elastomeric fishing lure body.

The upper die 10 presents a matching downwardly-facing recess 16 that registers with the recess 15 in the lower die when the two dies are together, as shown in FIG. 3.

Figure 2:
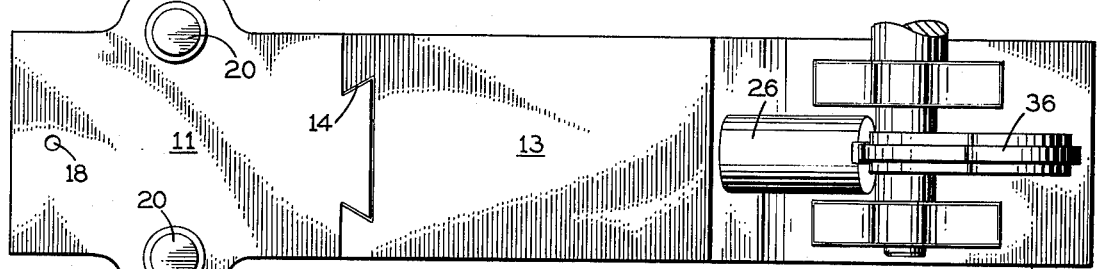
FIG. 2 is a top plan view of this apparatus.
Figure 5:
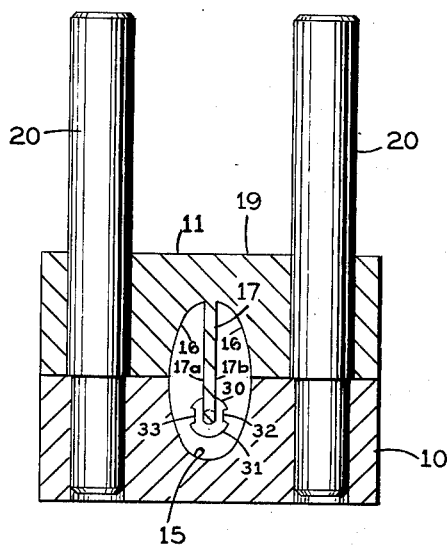
FIG. 5 is a vertical cross-section taken along the line 5—5 in FIG. 3.

The upper die 11 also has a depending central rib 17 that is relatively long in a direction lengthwise of the die assembly (from left to right in FIGS. 1–3), relatively deep (vertically in FIGS. 1 and 3), and narrow from side to side (perpendicular to its length and its depth), as best seen in FIG. 5. The opposite flat sides 17a and 17b of this rib extend vertically and parallel to each other. The rib has an inwardly and downwardly tapered end face 17c at its right end in FIG. 1, an inwardly and downwardly tapered end face 17d at its opposite end, a convex edge 17e merging smoothly with the lower end of the end face 17d and curving downward and to the right from it, and a flat bottom edge 17d merging smoothly with the curved edge 17e and inclined from it upward and to the right in FIG. 1 and intersecting the lower end of the right end face 17c at a bottom corner 17g that makes an angle of more than 90°.

The upper die 11 has an injection passage 18 that extends from its top face 19 down into its recess 16 to the left of the depending rib 17.

The upper die 11 is slidably mounted on a pair of vertical posts 20 that extend up from the base on opposite sides of the recess 15 in the latter.

With this arrangement, when the upper die 11 is lowered from the FIG. 1 position down to the FIG. 3 position, the confronting, matching recesses 15 and 16 in the lower and upper dies, respectively, define a mold cavity that is approximately egg-shaped except where the long, deep, narrow rib 17 is present.

At the right end of the upwardly-facing recess 15 in the lower die 10, the base 12 presents a circular opening 21 leading into this recess. The downwardly-facing recess 16 in the upper die has an approximately semi-circular opening 22 (FIG. 1) at its right end. When the two dies are brought together to close the mold cavity as shown in FIG. 3, the semi-circular opening 22 in the upper die 11 registers with the upper half of the circular opening 21 in the base and together they provide a circular opening leading into the approximately egg-shaped mold cavity at the right end. The axis of this circular opening is inclined at a slight angle downward to the left.

The base 12 has a cylindrical bore 23 extending coaxially with the opening 21. A cylindrical counterbore 24 and a short frusto-conical opening 25 extend between the lower end of bore 23 and the opening 21.

Figure 4:
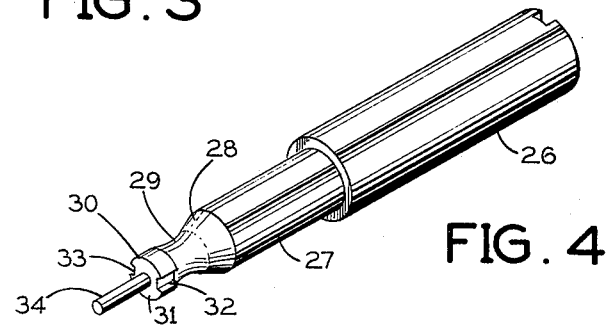
FIG. 4 is a perspective view showing the reciprocable plunger in this apparatus.

A plunger is slidably reciprocable in the bore 23. This plunger has a cylindrical upper end segment 26 with a sliding fit in the bore, a reduced diameter extension 27 extending to the left from segment 26 and having a sliding fit in the counterbore 24, and a short frusto-conical segment 28 to the left of the extension 27 end which has a snug, sliding fit in the frusto-conical opening 25. A generally venturi-shaped neck 29 on the plunger extends to the left from the frusto-conical segment 28. The surface of this neck is concave longitudinally and at any location along its length the neck it is circular in cross-section. At the left end of the neck 29 the plunger presents a pair of opposite, arcuate, circumferential segments 30 and 31 (FIG. 4) separated by arcuate circumferential grooves 32 and 33. At these arcuate circumferential segments 30 and 31 the plunger has a sliding fit in the opening 21 leading into the mold cavity. To the left of these arcuate segments the plunger terminates in a reduced diameter, cylindrical stem 34.

A coil spring 35 in the bore 23 is engaged under compression between the intersection of bore 23 and counterbore 24 and the left end of plunger segment 26. Normally, this spring biases the plunger to the right, as shown in FIG. 1. A rotary cam 36 engages the outer (right) end of plunger 26 and when turned from the FIG. 1 position to the FIG. 3 position it forces the plunger to the left, against the bias of spring 35. When this happens the frusto-conical shoulder 28 on the plunger is moved against the wall of the complementary frusto-conical opening 25 of the passage, the reduced neck 23 extends into the left end of the mold cavity, and the stem 34 on the plunger extends into abutting engagement with the right end face 17c of the rib 17 immediately adjacent the corner 17g on the latter. In this position of the parts, as shown in FIG. 3, the bottom of the plunger 34 is aligned longitudinally with the bottom edge 17f of the rib 17 on the upper die.

OPERATION

In accordance with the method of the present invention, the upper die 11 is moved from the raised position of FIG. 1 down to the FIG. 3 position so as to provide the mold cavity with the rib 17 in the middle. The plunger is moved from the retracted position of FIG. 1 to the extended position shown in FIG. 3, in which its stem 34 abuts against the adjacent end of the rib 17 on the upper die.

A suitable elastomeric material is injected under pressure through the passage 18 into the mold cavity, filling the mold cavity around the rib 17 and around the reduced end of the plunger. Preferably, this material is a plastisol comprising a paste dispersion of polymerized resin or other synthetic elastomer in powdered form in a non-volatile solvent (plasticizer), together with a filler, pigment and stabilizer used in low pressure plastic molding. After being molded, this material is readily flexible, resilient and deformable from the approximately egg-shape in which it is molded.

Figure 6:
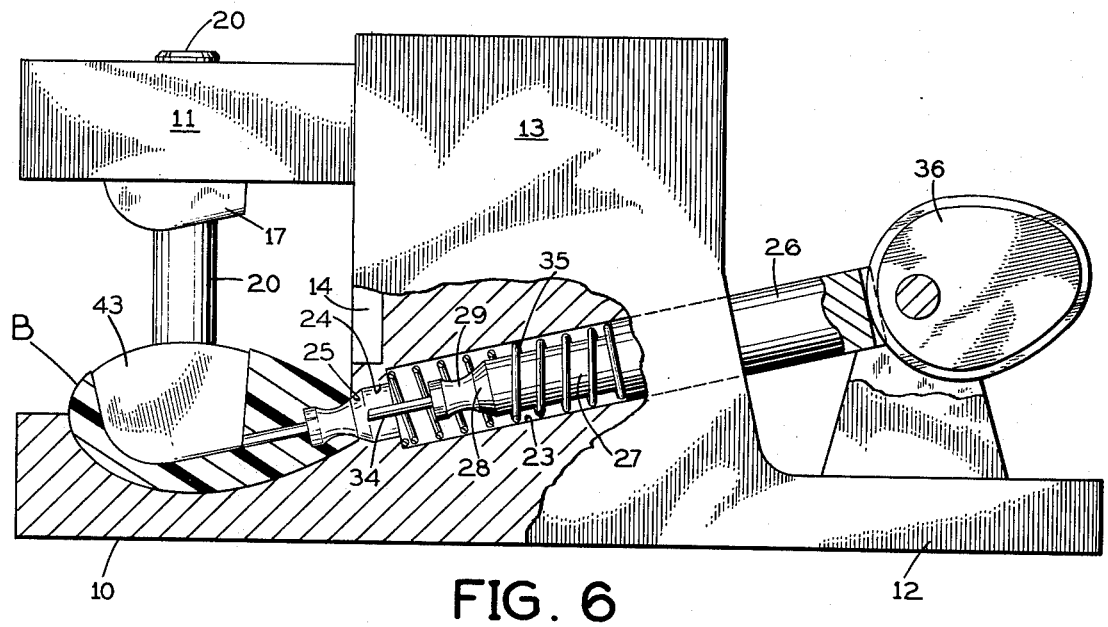
FIG. 6 is a view similar to FIG. 3 and showing the completion of the molding process.
Figure 7:
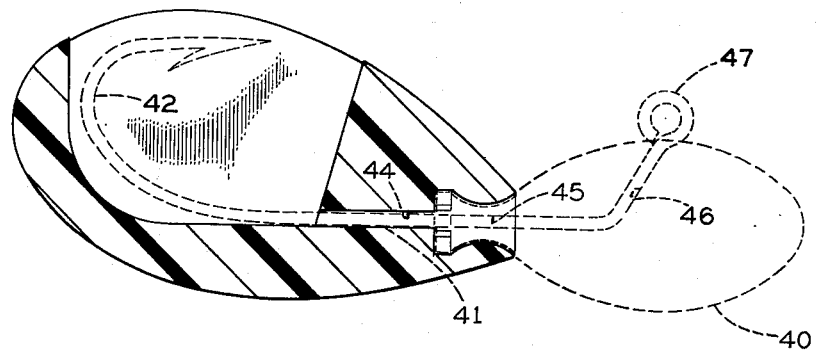
FIG. 7 is a longitudinal sectional view of a fishing lure, showing in full lines the elastomeric lure body made by the present apparatus and method and showing in phantom lines the fishhook and the metal head on one end of the elastomeric lure body.

The molded body B produced by the present apparatus and method has the configuration shown in FIG. 6. Preferably, this body B becomes part of a unitary lure assembly that also includes a smaller, generally egg-shaped metal or plastic head, shown in phantom at 40 in FIG. 7, and a fishhook, shown in phantom at 41 in FIG. 7. The fishhook has a curved hook end 42 that is completely disposed inside the long, deep, narrow recess 43 that was formed in the elastomeric body B by the rib 17 on the upper die 11. Also, the fishhook has a straight shank extending from this hook end through the narrow passageway 44 that was formed in the elastomeric body B by the plunger stem 34 and through an aligned passageway 45 in the metal head 40. The shank is bent to extend through an inclined passageway 46 in the metal head 40, and it provides an eye 47 at the outside for the attachment of a fishing line to the lure. The lure may be used in tandem or multiple.

I claim:

1. In an apparatus for molding an elastomeric, weedless fishing lure, said apparatus having first and second confronting dies which, when brought together, define a mold cavity between them, and a plunger reciprocable with respect to said dies at one end of the mold cavity for forming in the mold body a passageway, the improvement wherein:

said first die comprises a fixed base having an upwardly extending standard at one end thereof and a shelf at the other end thereof below said standard, said shelf having a bottom face and an upwardly-facing, concave recess therein that is generally the shape of half an egg;

said second die being reciprocable up and down above said shelf and having a downwardy-facing, concave recess therein that is generally the shape of half an egg, so that when said second die is lowered against said shelf, said concave recesses come together and define an egg-shaped mold cavity between them;

said second die having a narrow, elongated rib projecting downwardly from said downwardly facing, concave recess below said bottom face so that said rib extends into said upwardly-facing recess when said dies are brought together for forming in the molded body a deep, narrow, elongated recess which is open at the side of the molded body formed by said second die;

said rib having a bottom edge and an upstanding side edge facing toward the end of said cavity nearest said standard and spaced therefrom;

said recesses having at said end of said cavity a pair of semi-circular openings which, when brought together, form a circular opening leading into said cavity opposite said upstanding side edge, said circular opening having an edge;

said base having a bore therein extending from said opening under said standard through said base to the side thereof opposite said cavity;

a plunger reciprocable in said bore with respect to said end of said cavity, substantially in the direction of elongation of said rib, between a retracted position out of said cavity and an extended position abutting said upstanding edge of said rib and substantially aligned with the bottom edge of said rib, for forming in the molded body a passageway leading from the corresponding end of the molded body into the bottom of the recess therein;

said plunger having an inner end in the form of a stem which engages said upstanding edge of said rib in the extended position of the plunger with the dies brought together;

and said plunger having outward along its length beyond said stem an enlargement of larger cross section than said stem engageable with the edge of said circular opening to close the same when said plunger is in the extended position thereof;

said enlargement extending through said opening into said cavity in the extended position of said plunger for forming in the molded body an enlargement in said passageway which is spaced outward along the latter from said recess formed by said rib;

and said enlargement having a reduced neck of smaller cross section than the remainder of said enlargement lying within said cavity in the extended position of said plunger for forming an anchoring projection along said enlargement of the passageway in the molded body;

said enlargement also having a tapered surface at one end of said recess providing the surface which engages the edge of said opening when said dies are brought together and said plunger is in the extended position thereof;

said enlargement further having an inner end opposite said tapered surface with a pair of opposed grooves therein for forming in the molded body projections for preventing rotation thereof on a head inserted in said passageway.

\* \* \* \* \*